US011127096B2

(12) United States Patent
Tozzi (10) Patent No.: US 11,127,096 B2
(45) Date of Patent: Sep. 21, 2021

(54) COMPUTERIZED METHOD OF MEDIATING DISPUTED ISSUES (71) Applicant: ASK AMERICA, INC., Oakland, CA (US)

(72) Inventor: Christine Margaret Tozzi, San Francisco, CA (US)

(73) Assignee: ASK AMERICA INC., Piedmont, CA (US)

( * ) Notice: Subject to any disclaimer, the term of this patent is extended or adjusted under 35 U.S.C. 154(b) by 0 days.

(21) Appl. No.: 16/889,415

(22) Filed: Jun. 1, 2020

(65) Prior Publication Data

US 2020/0372593 A1 Nov. 26, 2020

Related U.S. Application Data (63) Continuation of application No. 13/016,597, filed on Jan. 28, 2011, now abandoned.

(51) Int. Cl.
*G06Q 50/18* (2012.01)
(52) U.S. Cl.
CPC .................. *G06Q 50/182* (2013.01)
(58) Field of Classification Search
CPC .................................... G06Q 50/182
See application file for complete search history.

(56) References Cited

U.S. PATENT DOCUMENTS

| | | | |
|---|---|---|---|
| 5,796,948 A | 8/1998 | Cohen | |
| 5,815,392 A | 9/1998 | Bennett et al. | |
| 5,895,450 A | 4/1999 | Sloo | |
| 6,766,307 B1 | 7/2004 | Israel et al. | |

(Continued)

FOREIGN PATENT DOCUMENTS

| | | |
|---|---|---|
| KR | 10-2002-0038429 A | 5/2002 |
| WO | 2000/68865 A1 | 11/2000 |
| WO | 2006/001833 A2 | 1/2006 |

OTHER PUBLICATIONS

Yahoo Answers. http://web.archive.org/web/20060615195338/http://answers.yahoo.com/ Wayback Machine, Jun. 15, 2006. 2 pages.
Yahoo Answers. "For your daily asking limit how may questions can you ask?" http://answers.yahoo.com/question/index?qid=20090715091633AA0fgUc, questions posted in 2009. 2 pages.

(Continued)

*Primary Examiner* — Aryan E Weisenfeld
(74) *Attorney, Agent, or Firm* — Procopio, Cory, Hargreaves & Savitch LLP; Noel C. Gillespie (57) ABSTRACT A computerized Internet web server/browser method of mediating disputed issues. Here a semi-anonymous mediation network, optionally linked to a pre-existing social network, containing various members interested in providing disputes to mediate and mediating these disputes, is created. Members may post disputes according to various issue types, have these disputes analyzed and commented on by other members, who will then receive feedback according to the success of their analysis. The system keeps track of member expertise in resolving these disputes, thus determining which members have better track records at resolving various types of problems. The system additionally may contain various analytical and graphical tools to enable members to analyze mediation responses according to the characteristics of the response givers. Members may additionally post general questions to other members and receive responses. Certain data may be shared with advertisers, who may post ads relevant to the disputed issues.

20 Claims, 4 Drawing Sheets (56) References Cited

U.S. PATENT DOCUMENTS

| | | |
|---|---|---|
| 6,801,900 B1 | 10/2004 | Lloyd |
| 7,529,679 B1 | 5/2009 | Pomerance |
| 7,630,904 B2 | 12/2009 | Vaidyanathan et al. |
| 7,689,516 B2 | 3/2010 | Burchetta et al. |
| 8,468,195 B1 | 6/2013 | Gannu et al. |
| 2001/0053967 A1 | 12/2001 | Gordon et al. |
| 2002/0035480 A1 | 3/2002 | Gordon et al. |
| 2002/0133362 A1 | 9/2002 | Karathanasis et al. |
| 2003/0055762 A1 | 3/2003 | Holt |
| 2004/0059596 A1 | 3/2004 | Vaidyanathan et al. |
| 2004/0204997 A1 | 10/2004 | Blaser et al. |
| 2005/0055232 A1 | 3/2005 | Yates |
| 2005/0125340 A1 | 6/2005 | Lin et al. |
| 2005/0171917 A1 | 8/2005 | Femenia et al. |
| 2006/0031177 A1 | 2/2006 | Rule |
| 2006/0129445 A1 | 6/2006 | McCallum |
| 2006/0286519 A1 | 12/2006 | Burnham |
| 2007/0294188 A1 | 12/2007 | Merrill |
| 2008/0154783 A1 | 6/2008 | Rule et al. |
| 2009/0170604 A1 | 7/2009 | Mueller et al. |
| 2009/0287642 A1 | 11/2009 | Poteet et al. |
| 2010/0131328 A1 | 5/2010 | Delugas et al. |
| 2011/0119151 A1 | 5/2011 | Chopra et al. |
| 2011/0196723 A1 | 8/2011 | Baszucki et al. |

OTHER PUBLICATIONS

Yahoo Answers Malaysia. "Married ladies: If your husband got a text from a woman saying the following, what would you think?" http://malaysia.answers.yahoo.com/question/index?qid=20100707183422AANLvFj, questions posted in 2010. 10 pages.

The North Carolina Court System. "Superior Court Mediator Certification." http://www.nccourts.org/Courts/CRS/Councils/DRC/MSC/Certification/Apply. Accessed Dec. 26, 2013. 2 pages.

Extended European Search Report for related EP Patent Application No. 12881587.5, dated Dec. 21, 2015, in 8 pages.

Examination Report for related EP Patent Application No. 12881587.5, dated Nov. 10, 2016, in 8 pages.

International Search Report and Written Opinion for related PCT Application No. PCT/US2012/048707, dated Mar. 29, 2013, in 10 pages.

COMPUTERIZED METHOD OF MEDIATING DISPUTED ISSUES

RELATED APPLICATIONS INFORMATION

This application is a continuation of U.S. patent application Ser. No. 13/016,597, filed on Jan. 28, 2011, which is hereby incorporated herein by reference in its entirety as if set forth in full.

BACKGROUND OF THE INVENTION

Field of the Invention

The invention is in the general fields of computerized internet social networks, computerized survey questionnaire methods, and internet advertising methods.

Description of the Related Art

Disputes regarding various issues between individuals are a constant part of everyday life. These disputes can range from minor to very serious. At one end, they can be simple domestic arguments about the division of chores in living arrangements, minor relationship issues, and the like. The disputes can be more serious disputes, such as disputes about automobile repair problems and auto accidents. The disputes can also be even more serious, such as civil torts and breach of contract disputes.

At present, there is no fully satisfactory method to handle any of these issues or disputes. (Note that a dispute will generally be composed of issues, and will generally have at least one issue, but may often contain multiple issues). Some problems, such as the less serious domestic arguments and minor relationship issues, are just too small for the legal system to handle at all. Other problems, such as small claims problems (often involving cash amounts under about $5,000 or $7,500) can be handled by small claims courts, and more serious tort or breach of contract problems can be handled by superior courts. However the court process is cumbersome. At a minimum, the parties must often hire attorneys, pay fees, and physically travel to the courthouse, where they may have to wait for a considerable length of time before the trial commences. If the trial involves a jury, the process is even more laborious, since the various jury members have to be summoned, physically travel to the court, and also wait, with a considerable loss in time and effort.

Although alternatives to the court system, such as private mediation services, often conducted by retired judges exist, such systems are generally also quite cumbersome, again often involving physical travel and a substantial amount of expense as well.

BRIEF SUMMARY OF THE INVENTION

What is needed is a simple, low cost, method, preferably internet based, that has the ability to handle many of the issues and disputes that are presently too minor for the legal system to recognize, and ideally scale up to handle some of the various issues presently being handled by small claims court and superior court. Here such a method is disclosed.

In one embodiment, the invention may be a computerized method of mediating disputed issues. This method may comprise creating a mediation network based on one or more Internet servers (or alternatively placing the system on the "cloud").

The mediation network may comprise at least a membership database of a plurality of member individuals who are interested in participating in mediation activities. This membership database may, for example, contain at least the email addresses, login identifications, passwords, aliases, ages, marital status and genders of the various members. The mediation database may generally also contain various member mediation experience counter(s), mediation history file, and optionally the approximate locations of the various member individuals.

Typically the mediation network will make at least the alias, age, gender, mediation experience counter, and mediation history file for the various member individuals publically available. This way, for example when a member logs in and is interested in selecting various other members for mediation assistance, the system may provide a directory one or more web pages listing the various members by alias name, as well as this type of information. Often the system will then allow the member to sort through this directory and pick out, for example, other members that may have a high experience level, and a high success level, in mediating the particular type of dispute, issue, or problem of interest at that time.

A mediation network member will typically interact with the mediation network through web browsers running on standard computerized devices, such as smart phones (e.g. iPhone, Android, and the like), desktop computers, laptop computers, tablet computers, and other devices, which in turn will be connected to the Internet via one or more wired or wireless communications links.

The first member (e.g. dispute member(s)) can then solicit help regarding a dispute or issue by, for example, transmitting the existence of this dispute or issue, via the mediation network's web server, to the web browser of one or more second mediation network member individual(s). As a result, when these one or more second member individual(s) (e.g. mediation member(s)) is/are logged in to the mediation network (i.e. logged in to the one or more Internet web servers that create this mediation network), these one or more second member individual(s) can choose to participate in mediating this particular dispute or issue.

The mediation network may monitor the second member(s) mediation participation by multiple means. For example, when the one or more second member individual(s) chooses to enter their mediation decision(s) for a particular case, in addition to transmitting these one or more mediation decisions back to the one or more first member individual(s), the system may also store the decisions in its mediation database for later statistical analysis. The system will additionally at least increment a mediation experience counter(s) associated with each participating second member. Here one or more types of mediation experience counter may be used. For example, the disputed issue may be assigned to one or more dispute or issue types, and there may be a different mediation experience counter type assigned to each disputed issue type, as well as an overall accumulated mediation experience counter that keeps track of all mediation experiences.

In order to evaluate how successful the various second members are at mediating various types of disputed issues, the system will also allow the various first members to enter in feedback regarding how satisfied the respective first member(s) are with the mediation advice given.

In operation, by necessity the mediation network will generally accumulate information, such as age, gender, approximate geographic location, and type of mediation issues under discussion. This information can also be quite valuable for advertisers, and this advertising tie-in may help finance the system in operation, thus reducing or eliminating user costs. For example, automobile repair shops may be interested in local automobile accident disputes, and may pay to advertise their services to local cases. Thus in some embodiments of the invention, this information (generally on a user anonymized basis) may be provided to advertisers. These advertisers may in turn provide or upload advertising media to the mediation network. The mediation network may in turn transmit this advertising media, generally as part of the uploaded mediation network web pages, to the various mediation network members that meet various advertiser specified criteria for age, gender, approximate geographic location, and type of mediation issues.

In some embodiments, the mediation network membership may be affiliated with, linked to, or run under an existing social network such as Facebook.

In addition to mediating disputes, the mediation network may additionally help members post questions on a wide variety of other issues to other mediation network members, and use the network's capabilities to receive and analyze responses to these questions.

DETAILED DESCRIPTION OF THE INVENTION

The basic vision of the invention is to provide a method for implementing an online mediation network, which would be a web (internet server/browser) based place where individuals (members) can virtually meet to resolve conflicts and reconcile with others. Other goals of the invention are to allow individuals to both give and get feedback on various issues, some disputed, some not, and by this feedback gain greater insight into how best to handle these respective issues. The mediation network is also intended to allow individuals to share their learning, life experience, and wisdom with other individuals.

At present, as previously discussed, the formal legal system for mediating disputes is expensive, slow, and relatively "toxic" in that it can often foster continued disputes and By contrast, the invention is intended to provide a quicker, less expensive, and less toxic alternative to legal systems, at least with regards to various small claim issues, and various civil issues that are open to mediation based process. It is also set up to preserve the anonymity of the individuals involved.

The invention's mediation network has other purposes as well. By providing a continual range of potentially interesting disputes to mediate or at least monitor, the mediation network will provide considerable entertainment value. Further, although the invention will be designed to respect user privacy, in the process of mediating disputes, the invention will be generating valuable data, such as types of disputes (e.g. damaged car), location of disputes (e.g. the zip code 95030), and the like that would potentially be highly valuable for advertising purposes (e.g. car repair shops located near the 95030 zip code).

Setting Up the System

Disputes often involve sensitive or private material, and in order to encourage candor, the mediation network system may be designed to emphasize user privacy issues. On setup, the system may require the user's real email address (or instant messaging address or online voice/video chat address), but then usually shield this real email address from other users by either routing email or text or voice chat through the system and keeping the actual email address anonymous, or alternatively routing email, instant messaging, or voice/video through third party systems through anonymous links.

In some embodiments, additional user verification steps may also be done as required, such as through driver's license data, credit card data, or other hard to counterfeit identification data to ensure system safety and, for example, to prevent unscrupulous users from signing up under multiple accounts and/or spoofing the system. This verification data will generally not be released to the general user base or to advertisers, however.

Once registered and optionally verified, the system will generally either invite the user/member to either provide a "stage name" or alias name, or alternatively may automatically suggest or provide the stage name/alias name. This stage name/alias name will generally be changeable at user digression, but the underlying user/member statistics will remain the same regardless of these name changes.

In order to provide good, if anonymous, demographic information for mediation selection, analysis, and advertiser purposes, the users will often also be prompted to enter in additional information, such as the user's age, gender, marital status, general location (e.g. country, state, county, city, or zip code) and potentially also, depending upon legal admissibility criteria, other information such as race, religion, educational status, income level, political affiliation, and so on.

The system will generally always keep track of the number of disputes that that member has participated in, the decisions that the member has rendered, the dispute originator feedback on these decisions (e.g. a numeric rating of quality of decision, check box analysis (good, fair, bad), and verbal comments). The system may optionally also keep track of the type of dispute that the member has previously participated in, the approximate geographic location where these disputes have originated, and so on. This way, for example, some mediation network members may acquire system recognized expertise in certain types of dispute topics (e.g. automobile disputes, domestic disputes, workplace disputes, and so on).

Although the mediation network may, for many applications, act as an alternative to small claims court or civil court for various disputes, for other applications, the mediation network may also serve as a convenient forum for conveying advice or feedback on a variety of non-legal related issues as well. For example, a first member may login to the mediation network and solicit advice on relationship issues in sort of a "Dear Abby" or "Mrs. Manners" online analog from a panel of either selected or non-selected second members. In this advice giving mode, a first member may for example describe a problem that may have occurred on a recent ski trip taken with friends, upload additional information—e.g. descriptions of the trip and hotels, descriptions of the friends, and so on, and then request non-legal feedback from the second members in the form of either checkbox responses (e.g. "friends should not have gone on the trip", "friends should have gone, get over it", and so on), or as text responses. The first member may also set the system to collect responses over a set period of time (e.g. one week), or for a set number of responses (e.g. 100 responses) before closing the issue.

Once the preset number of days or responses has been reached, or upon early termination by the first member, the first member may then take advantage of various statistical analysis programs and graphics programs provided by the system to analyze the number of responses, such as presenting the response data broken down by the second member's age, gender, or previous experience with this type of issue, and then providing suitable statistical analysis (e.g. bar graphs, line graphs) and numeric statistics (e.g. 60% "friends should not have gone on the trip", 40% "friends should have gone, get over it) as appropriate.

Use of Comments

In addition to voting, mediation network members who have been asked to vote on a particular issue may also be given the ability to provide comments regarding the issue, and the first member who has posted the issue or dispute may be allowed to review the comments at any time. To preserve anonymity, the comments generally show up only under the screen names or aliases assigned to these members. Again these screen names/aliases may be either changed regularly by the computer system, or alternatively the various members may choose to build their reputations by repeatedly using the same screen name or alias.

In order to avoid bad language, the system will often employ one or more levels of moderation. In a first level of moderation, automatic text recognition software may scan the comments for improper words or phrases, or known variants of these improper words or phrases, as well as activity associated with high emotions, such as typing in all capital letters. In a second level of moderation, either on an as requested basis, or other appropriate basis (e.g. randomly, according to previous history, and so on), human moderators may come in and delete or edit comments as appropriate.

Issues and Disputes Involving Multiple Individuals

Often various types of issues involve more than one individual. These disputes can be friendly (non-adversarial), or they may be adversarial. In the case of non-adversarial issues or disputes, the system may allow more than one first member (e.g. dispute member(s)) to logon and work on creating and editing the particular issue or dispute in question, as well as create and edit a menu of proposed options to give the second members who will be asked to pass judgment on the dispute. Thus one first member may login and create a first draft of the proposed issue, then electronically pass the issue to another first member who can login and edit the issue, and pass it back again. Alternatively both first members may log in at the same time. These first members may also annotate the description of the dispute with additional information, such as photographs, links to witnesses, testimony from witnesses, and so on.

In an alternative embodiment, which is particularly useful for more adversarial disputes, the more than one description of the issue, event, or dispute in question may be entered in. Here, for example, an initial first member, here called the plaintiff member(s) (or plaintiff dispute member), may enter in the plaintiff member's view of the issue, event, or dispute, and other first members involved in the dispute, but with differing viewpoints, here called the defendant member(s) (or defendant dispute member), may enter in their version of the issue, event, or dispute. Indeed the system may be designed to accommodate a different version of the issue, event, or dispute for each first member participating. However for simplicity, most of the examples in this specification will discuss a simple two-sided issue or dispute, and here the two sides will be generally referred to as a "plaintiff" side and a "defendant" side. Note that although this plaintiff/defendant nomenclature is particularly useful for discussing quasi-legal issues or disputes, the methods of the invention are in fact more general purpose and may be used for many other non-legal purposes, such as the "Dear Abby" or "Mrs. Manners" advice giving purposes previously described.

As previously discussed, in other embodiments, the invention may also function in a quasi-legal mode to help mediate issues and disputes, which may involve more than one first member. Here several options or embodiments can be done. In a first option or embodiment, the system will enable the first member(s) who are submitting the issue/dispute to also appoint a panel of second members who may act on a jury like basis to resolve the issue/dispute. This "jury" or panel of second members may be selected on a random basis among system members that meet certain criteria pre-selected by either the system or by the first member(s). These pre-selection criteria may be one or more criteria such as online status of the second member, previous experience, age, gender, voting history, approximate geographic location of the second member, and so on. Continuing the "jury" analogy, after initial selection, this panel of second members may be further screened by the various first members, and at least some of this panel may then be selected or dismissed based on agreed upon criteria.

In one embodiment of the invention, which is particularly useful when quasi-legal issues are being resolved, but which may also be useful for non-legal applications as well, the various first members may be allowed or required to place something into an escrow account. This "something" could be money, in the case where the mediation issue may involve an issue that can be resolved by cash, or alternatively can be a physical object, such as a disputed item of property, which might potentially be sent or mailed into a neutral repository for safe keeping. Based upon prior agreement, when the issue or dispute is ultimately resolved, including any optional pre-agreed upon appeals, the system will then release the escrow funds or other item to the winning party, or otherwise dispose of the item as per previous agreement.

In addition to "jury like" panels of members, the system may also enable certain more highly qualified members to serve in a judge like capacity. Here, the system may operate by selecting various members with an experience level in one or more issue types, positive feedback level, or other criteria (e.g. age, real-world legal experience) and designate them as "Judges". The system will make the "judge" status of such members known, and will allow other members to select judges to mediate disputes either on a standalone basis (e.g. one judge), on a panel of judges basis (e.g. three judges), or as moderators to help summarize issues and guide the decisions of the system's online jury.

In one embodiment, such judges can enable disputes to be rapidly solved on a real-time basis. In this mode, the relevant first members, such as the plaintiff first member, and the defendant first member, and the second member(s) serving as judge(s) may be online at the same time. Then, much as a real-world court, the first members will relate their particular version of the facts and issues, the mediation network judge(s) will ask questions, and then decide the issue/dispute, either in real time, or after suitable reflection as required. Private judges or retired judges may also be used on a paid basis.

Results of Mediation

Depending upon user selection, the system may either allow the results of a particular case to be viewed by any other mediation system member, or alternatively only by a subset of members (such as jury or judge members associated with that particular issue or dispute), or kept entirely private. The system may additionally allow first members to pay the other second members for their time and contribution, as desired.

Other Applications

In addition to quasi-legal mediation and less formal "Dear Abby"/"Mrs. Manners" type mediation, the system may also function to keep its members entertained by allowing users to put up random questions with multiple choice answers, as well as collecting and displaying statistics on the resulting answers. Users additionally may be able to search for mediation opportunities by category or case number (e.g. a friend may refer an interesting case number for review) for purposes of entertainment as well. The site may be marketed on billboards and through other forums, such as by use of one or more online scrolling screens, which may highlight interesting mediation cases, and encourage users to log on and submit their opinions.

Getting Feedback

In some embodiments, in order to insure that the system is collecting good feedback regarding the success or utility of the various members regarding their mediation efforts, the system will require that the first members who originated the dispute or issue in question to provide feedback prior to closing out that particular issue or dispute. This feedback can include feedback such as "I/we took the advice and were pleased with the results, I/we didn't take the advice and wish we had, I/we took the advice and wish that we had not, I/we did not take the advice and were glad that I/we did not", and so on. The feedback can also be if the issue has been totally resolved, partially resolved, or not at all resolved.

The system may further limit each member to a preset maximum number of open or unresolved issues or disputes at any given time. This maximum number may be a constant, or may be varied according to the experience level of the member. In some embodiments, members may be able to purchase an ability to put up an additional number of open issues above and beyond the minimum default number.

Advertising/Analytics

Although the main focus of the invention is on techniques to improve the dispute mediation process, as a side product of mediating many disputes, the system will acquire much information which, although still anonymized, can still be quite valuable to advertisers. This is because disputes may be categorized as to type: specific problems with relationships, neighbors, automobiles, products, renting, purchases and so on, as well as to geographic area (i.e. city, zip code), and each specific problem may be of specific interest to various local, regional, national, or international businesses that provide solutions to these specific problems. Thus as previously discussed, an automobile accident dispute may be of interest to local auto repair shops, auto dealers, or insurance agencies. A domestic dispute may be of interest to local marriage counselors, tenant-landlord issues may be of interest to local apartments, as well as local real estate agents and legal firms, and so on.

The system may thus generate revenues by, for example, selling the ability for advertisers to place text or graphic advertisements along with the various mediation web pages served up by the system. A particular advertiser may, for example, then elect to purchase 1000 ad impressions based on a set range of dispute topics or issues, within a particular geographic area, and going to members in a certain age range.

The user may use a web browser user interface to set up a new case, issue, or dispute. Here the user may, for example, click on an issue general topic, such as relationships, work, neighbors, real estate, product sales, and the like, and from this general topic select various sub-topics, such as landlords, tenants, property taxes, insurance and the like under the real estate general topic. Similarly a broad relationships topic might be further subdivided into various sub topics such as marriage, divorce, living together, friends, children, and so on.

The user may next click on additional menu items, such as type of case, issue or dispute: e.g. advice, mediation network opinion, small claims disputes (e.g. money amounts under a certain limit such as $5,000 or $7,500. The user can also select other items such as single party, multiple party, role (plaintiff, defendant), and as needed sign up any co-parties to the issue or dispute as well.

The user may then select other options as well, such as mediation level requested (e.g. seeking advice, getting opinion, jury mediation, judge mediation) an additionally may post money or other items into escrow pending the mediation decision, as desired. Alternatively the user may put less or nothing at stake, and even select an option stating that the opinion is simply wanted for advisory purposes only, and that the user has little or no intent of actually taking the advice.

Other options selectable by the user include judge or jury characteristics desired (e.g. age, sex, experience level, location, and so on), and optionally preferred second members (jurors) may also be selected. Privacy options—e.g. making the case open to the general membership to view, or closed to all but a selected group of members, and suitable screen names may also be selected.

Once initiated, the system will often generate both a case number and a URL or other means so that the case may be viewed as needed. In some embodiments, the web page(s) where the case may be accessed from the outside may be behind a security wall, encrypted, or otherwise protected to help preserve case privacy from unauthorized viewers.

The mediation network may also have many other options as well, such as access to libraries, even legal libraries, where members may research various topics of interest to the mediation process.

Specific Examples

Thus in one embodiment, the invention may be a computerized method of mediating disputed issues. This method may comprise creating a mediation network based on one or more Internet servers (or alternatively placing the system on the "cloud").

These Internet servers may be based on one or more computer processors, such as the popular Intel or AMD x86 series of processors, computer memory (often RAM, Flash, or Disk drive memory), network connections to the Internet, and suitable operating system software such as Windows, UNIX, Linux or other variant. The Internet server(s) will typically contain or be connected to data storage devices, often disk drives or flash memory, and in turn may control and manipulate one or more databases, often by way of database software such as MySQL or other software. The Internet servers will also often run web server software, such as Apache, and interact both with the various mediation network members by serving HTML based web pages by way of various middleware such as PHP, Perl, Ruby and the like.

The mediation network will typically comprise at least a membership database of a plurality of member individuals who are interested in participating in mediation activities. This membership database may, for example, often contain at least the email addresses, login identifications, passwords, aliases, ages, and genders of the various members. The database will also contain various member mediation experience counter(s), mediation history file, and approximate locations of the various member individuals.

Typically the mediation network will make at least the alias, age, gender, mediation experience counter, and mediation history file for the various member individuals publically available. This way, for example when a member logs in and is interested in selecting various other members for mediation assistance, the system may provide a directory one or more web pages listing the various members by alias name, as well as this type of information. Often the system will then allow the member to sort through this directory and pick out, for example, other members that may have a high experience level, and a high success level, in mediating the particular type of dispute, issue, or problem of interest at that time. Alternatively, the system may assign mediators either randomly or according to an alternative predetermined scheme. In many embodiments, when mediators log in, the system may present them with a list of issues (e.g. by displaying a rolling list of issues, or by other presentation format). Here mediators may choose to provide their mediation assistance as they desire. Mediators may also be prompted to provide input based upon their prior experience, as judged by the system.

In operation, a member may proceed to use the mediation system by, for example, entering a first set of facts related to a disputed issue (usually involving this member) into a web browser running in the graphical user interface of an internet connected computerized device. To do this, the system will often provide various web pages containing suitable check boxes, forms, and data entry locations where the member may enter in this information. The member can then use this web page to uploading this first set of facts to an issue database connected to the Internet web server(s). This first set of facts can include human witness email links, telephone numbers, or other hypertext links.

If more than one first members are involved in setting up the dispute or issue, the system may be configured to enable multiple first members to collaborate, allowing both to enter and edit this first set of facts.

In some cases, more than one first member may be involved in the issue or dispute, but these members may be on opposite sides of the issue or dispute, and neither may wish the other access to edit their particular version of the facts. In this case, the system may be designed to handle such adversarial situations.

For example, the system may be designed to designate at least some of the first members as plaintiff first members, and other first members as defendant first members. The system may then allow the first set of facts to be divided between a plaintiff first set of facts and a defendant first set of facts. The system will allow the plaintiff first members to edit the plaintiff first set of facts, and allowing the defendant first members to edit the defendant first set of facts. After this is done, the system may then present both sets of facts to the various second members for subsequent mediation. The system can be designed to be flexible, and can have multiple categories of first members, each with their own respective set of facts, and each with control over presenting their own respective set of facts, as needed.

In some embodiments, the mediation network may be affiliated with a pre-existing social network, such as Facebook, Twitter, MySpace, and the like. For example, the mediation network may be either linked to the preexisting social network's operating system, or run under the preexisting social network's operating system. Here, to preserve anonymity, only some data from the social network's database may be used, and other parts, such as identifiable names, may be suppressed. Thus, for example, a Facebook user in need of mediation services may click on a Facebook link, and be able to access the mediation network, have some information (e.g. age, rough geographic location) ported over to the mediation network, yet be confident that he or she could then resolve disputes in relative privacy, with the issues kept isolated from the rest of the user's social network, and only shared according to a level authorized by the user.

The web browser will typically be a standard web browser, such as Internet Explorer, Firefox, Chrome, Safari, and the like, often running on a standard computerized device, such as a smart phone, desktop computer, laptop computer, tablet computer, and the like, which in turn is connected to the Internet via one or more wired or wireless communications links. This computerized device will itself typically be made up of one or more computer processors, memory, video display devices, user interface devices (e.g. keyboards, mouse devices, touch sensitive screen devices) and suitable network connection(s), run under the control of various operating system software such as Windows, Linux, Android, iOS, and the like.

The member can then solicit help regarding this issue by, for example, transmitting the existence of this disputed issue, via the mediation network's web server, to the web browser of one or more second mediation network member individual(s). As a result, when these one or more second member individual(s) is/are logged in to the mediation network (i.e. logged in to the one or more Internet web servers that create this mediation network), these one or more second member individual(s) can choose to participate in mediating this particular disputed issue.

In operation, assuming that at least one second member individual chooses to participate in mediating this disputed issue, the mediation network will transmit this first set of facts to the relevant second member(s), and invite these relevant second member(s) to transmit back, again usually by entering data into a web page on the second member's web browser, at least one mediation decision regarding this disputed issue. The mediation network will then keep track of this decision, and ultimately relay this decision, along with the decisions rendered by other mediation network second member(s) back to the one or more first member individual(s).

Alternatively the facts may be presented so that the relevant second member(s) may simply click on a response choice (e.g. accept facts, accept paragraph 1, reject paragraph 2, reject all facts, and so on) among several choices that are laid out either by the first member, or by the system itself.

The mediation network may monitor the second member(s) mediation participation by multiple means. For example, assuming the one or more second member individual(s) chooses to enter their mediation decision(s), in addition to transmitting these one or more mediation decisions back to the one or more first member individual(s), the system may also store the decisions in its database for later statistical analysis. The system will additionally at least increment a mediation experience counter(s) associated with each participating second member. Here one or more mediation experience counter may be used. For example, the disputed issue may be assigned to one or more types, and there may be a different mediation experience counter assigned to each disputed issue type, as well as an overall accumulated mediation experience counter that keeps track of all mediation experiences.

In order to evaluate how successful the various second members are at mediating various types of disputed issues, the system will also allow the various first members to enter in feedback regarding how satisfied the respective first member(s) are with the mediation advice given. This will be usually done by having the mediation network web server(s) again serve up at least one evaluation web page to the web browser(s) of the various first member(s), which will typically provide suitable checkboxes, radio buttons, sliders, text entry regions, numeric ratings, and so on where this feedback can be rendered. Often the system will then assign this feedback information to the various participating second members, often on a per disputed issue type basis. This way, for example, a particular mediation network second member, after mediating various disputed issues, might get an excellent feedback rating with regards to mediating auto repair problems, but a lower rating with regards to mediating personal or family disputes. Based on these ratings, other mediation network members would come to know that this particular individual may be a guru with respect to automobiles, but is probably best not consulted for delicate personal issues. Another individual may accumulate a reverse rating, and become recognized as very wise with respect to interpersonal problems, but best not consulted with respect to anything mechanical, and so on.

The mediation feedback will generally be stored in the mediation history file(s) that are associated with each member. The mediation feedback may also be stored and associated in the history files associated with the originating first member as well, and optionally also either publically displayed, or at least displayed to potential second members prior to accepting a mediation assignment from that particular first member. This way, for example, if a particular first member has a history of giving low feedback for everything, the person might gradually acquire a reputation as being a difficult individual, and other members can take this into account when deciding whether or not to help this individual in various future mediation problems.

Figure 1:
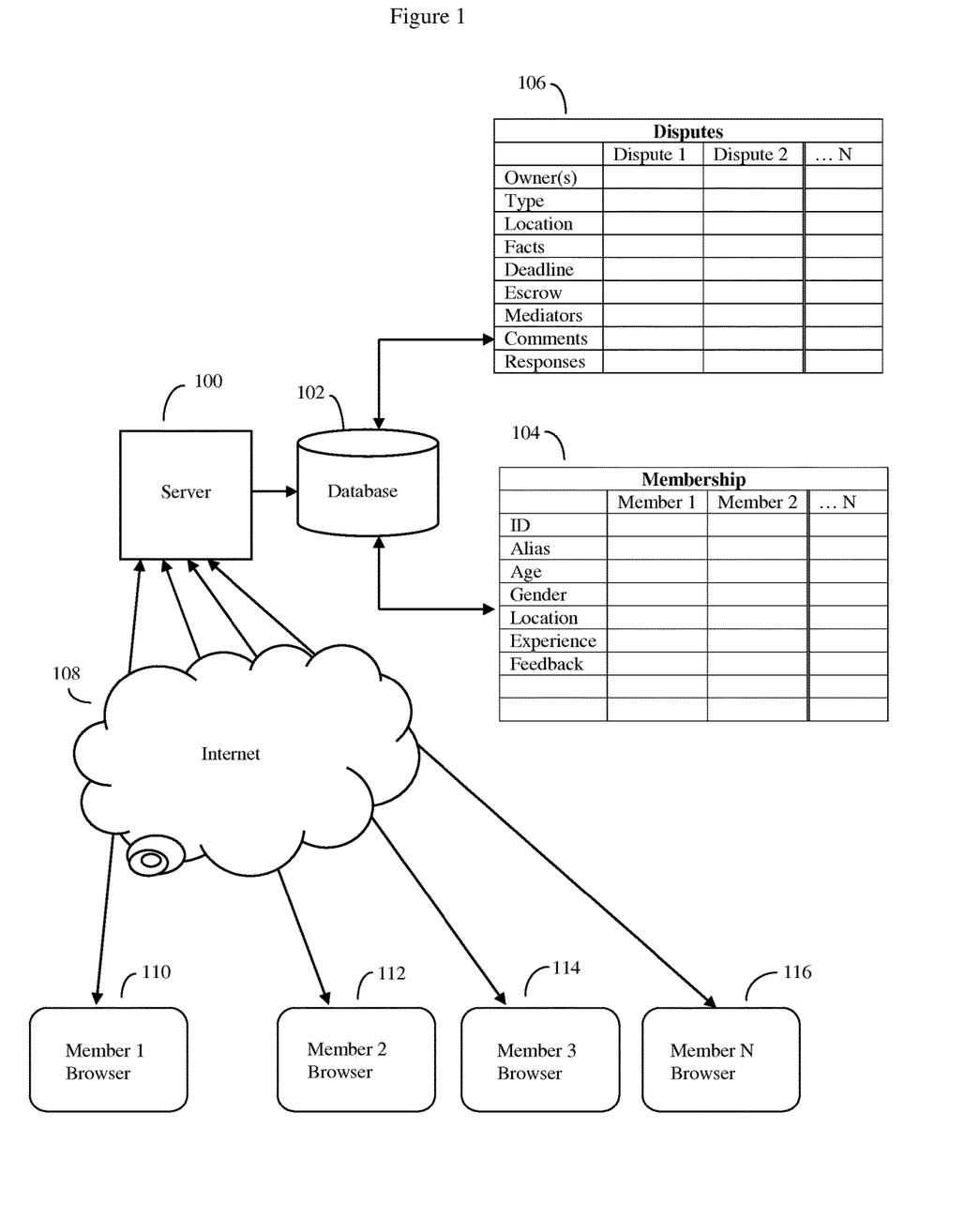
FIG. 1 shows an overview of how the mediation network may be implemented on an Internet web server-web browser system.

An example of some of the data flow involved in this method is shown in FIG. 1. Here the mediation network software may be stored on Internet server (100), which in turn may be connected to database (102). Database (102) in turn may store membership data pertaining to the various mediation network members (104) such as member ID (e.g. email addresses, and/or other contact information such as phone numbers, social network link, etc.), alias (e.g. system name), age, gender, location, experience (often broken down by dispute issue type), member mediation feedback (again often broken down by dispute issue type), and other information as desired. Database (102) or other database may also store dispute data (106) pertaining to the various ongoing and historical disputes or issues, including the dispute owners (i.e. the first members that placed the dispute and issues onto the system in the first place), type of dispute, approximate location of the dispute, various dispute facts, any deadline or maximum number of responses set to mediate the dispute, and funds or items placed in escrow pending dispute resolution, list of dispute mediators, comments regarding the dispute, and the various mediator dispute responses.

Internet web server will generally be connected to the internet (108) and though the internet make connections with various web browsers (110, 112, 114, 116) running on computerized devices that in turn are being used by the various mediation network members.

The approximate location information associated with each member may be information such as the user's country, state, county, city, and/or zip code. In some embodiments, the system may request the member's complete address, but then only make the approximate location available to other users in order to preserve member anonymity.

Alternatively, in some embodiments, the system will allow all users to a particular dispute to mutually identify themselves to other dispute participants as long as proper permissions are obtained. In these situations, members of a dispute may invite others to a dispute by, for example, exchanging an internet link such as a URL, or by other means.

The first set of facts entered in by the first member regarding a disputed issue can be almost anything. These facts can include text descriptions of the issue, photographs, videos, sound recordings, links to witnesses, witness statements, links to other websites or external data, and so on. In order to preserve anonymity, the system may optionally make use of various software filters, or moderators, or even human moderators, designed to screen the data for potentially sensitive information, such as identifiable names and addresses, and automatically redact such sensitive information according to mediation network system policies.

In order to move the mediation process along, the system will often enable the first member individual(s) who originate the disputed issue in the first place to additionally set either a mediation response deadline or a minimum number of second member mediation responses needed to complete the mediation process for any given issue or dispute.

As previously discussed, often the mediation network will provide one or more statistical analysis and/or graphical analysis software modules to enable the one or more first member individual(s) to analyze the various mediation decisions supplied by the various second members participating in that particular issue or dispute. These statistical analysis tools and or graphical analysis tools will often be various software applications or modules, often residing on the mediation network's network server, which can process the second member mediation decisions that are stored in the mediation network database, and then transmit the analysis results to the first member's web browsers. These statistical analysis and/or graphical analysis software modules or tools may, for example, enable the various first member individuals to analyze the mediation decisions by any combination of the characteristics of the various second members. For example, the data may be analyzed according to the second member's age, gender, mediation experience counter, mediation history file, or approximate geographical location of said at least one second member(s).

Thus, for example, a user with a computer related issue may find it useful to do an age sort (analysis) of the mediation data, often using statistical and graphical tools supplied by the mediation network system, and may find, for example, that filtering the mediation responses by age may produce better results if the feedback from older mediation network members is de-emphasized or discarded. By contrast, a user with a delicate personal problem to resolve may obtain better results by preferentially taking the mediation data from older mediation network members, and possibly taking the gender, mediation type experience, marital status and other second member(s) characteristics into account as well.

In order to facilitate the mediation process, particularly when multiple second members are assigned to a particular issue or dispute, in some embodiments, it may be useful to allow the various second members to exchange comments, either between themselves, with the first mediation member(s) that initiated the issue, or any combination of the two. As previously discussed, in order to maintain decorum, in some embodiments, the system may screen these comments for inappropriate words using an automated or human text checker.

Additionally, to facilitate mediation data analysis, often it will be useful to provide the mediators with a preselected list of responses, so that mediators need merely check a particular response. Use of such a list can greatly facilitate summing up results from multiple mediators. Such a preselected list of responses can be generated by a variety of means. In one option, the first user entering in the dispute may generate the list of responses as part of the dispute description and set-up. Alternatively the system may automatically generate a list of responses based, for example, on the type of dispute in question. As yet another alternative, the system may as an additional service allow a dispute initiator to request one or more human moderators to provide a list of responses for the dispute. As yet another alternative, the mediators may vote on what list of responses is most appropriate first, and then enter in their responses as a second step.

As previously discussed, in some embodiments, it may be useful to designate certain mediation network members with a mediation experience counter or a mediation history file that exceeds a preset limit as judges, at least within their particular mediation type category of expertise. These judges may be authorized by the mediation network to conduct mediation sessions between plaintiff first members and defendant first members, or other combinations of first members as desired. Here, mediation network members that have previous real-world legal, mediation, or counseling experience may be given extra credit in their mediation experience counter and/or mediation history file by the mediation system or mediation system moderators, and this can help put the system on a sound footing.

Figure 2:
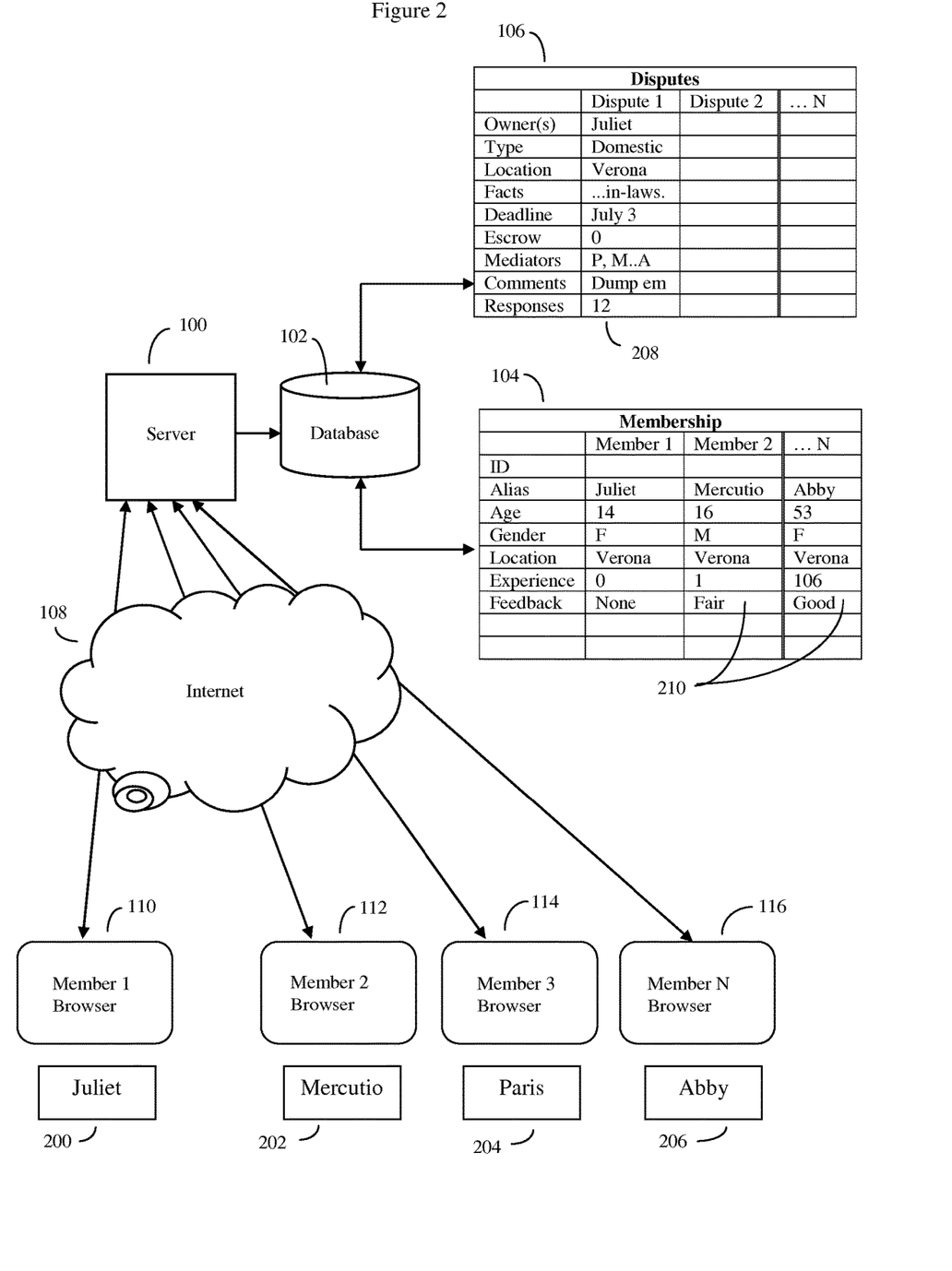
FIG. 2 shows the system being used to resolve a domestic dispute.

FIG. 2 shows an example of some of the data flows that can occur while the system is operating. In this example, the first member, going by the alias of "Juliet" (200), is asking the system to help resolve a domestic issue involving a fiancé and various relatives and in-laws. The various second members who are available to help include a second member with the alias "Mercutio" (202), another second member with the alias "Paris" (204), other second members, and an N'th second member using the alias "Abby" (206).

Here Juliet (200) may contact the mediation network through her web browser (110), and initiate dispute 1 by sending back data to the web server (100) and database (102). The web server and database (102) will update the dispute portion of the database (106) with the information that Dispute 1 is owned by Juliet. Juliet can further enter that the dispute involves a domestic issue type, and the location is the city of Verona. Juliet can further enter in other facts, such as that the dispute involves potential in-laws, that no money has been put in escrow, and the like.

Various second members, again usually operating under aliases, may be selected by Juliet or the system to help mediate the dispute. In this example, either Juliet or the system may have decided to select on the basis of location, so all the second members have been chosen from the same city of Verona. Here various second members are helping to mediate this process, including one member with the alias "Mercutio" (202), another member with the alias "Paris" (204), other members, and an nth member with the alias "Abby" (206).

The membership data associated with these members is shown in FIG. 2 (104). As can be seen, "Mercutio" is apparently a young man of 16 with no previous experience in these matters, the data for "Paris" is not shown, and the Nth second member is someone named "Abby" is a middle aged woman who has apparently had substantial mediation experience in this area, and is highly rated.

The number of mediators selected (here N is assumed to be 12), their comments, and their respective responses are further saved in the dispute database (106).

Once the time has expired, Juliet may then analyze her mediation results by using appropriate statistical and graphing software applications, often provided by web server (100), to analyze the mediation response data (208).

For example, although the initial mediation response data may have been evenly divided with six out of 12 second mediators recommending the "get married and run off" option, and six out of 12 second mediators recommending the "you're too young, cool it, stay friends, and see what develops" option, when Juliet analyzes the data by age, she may see that when she selects and age 20 option for the cutoff, most of the "get married and run off" option is being selected by mediators under 20, while most of the "you're too young, cool it, stay friends, and see what develops" option is being chosen by mediators over 20. She may also see that the responses from mediators with a high feedback rating follow similar lines. The system software, often running on web browser (100), can send suitable graphics to Juliet's web browser (110) to help her visualize the various options.

Juliet can then make her determination of what advice is best, and provide feedback rating to the various participating members (210) regarding their recommendations (210) in this case.

Figure 3:
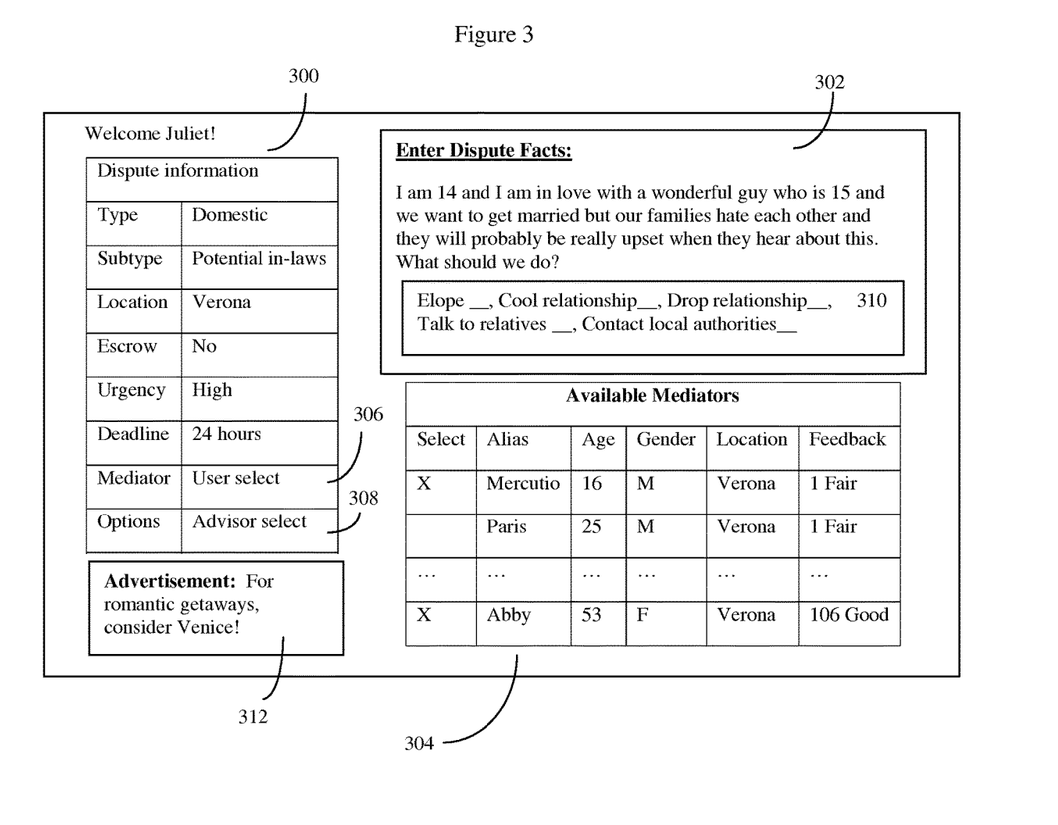
FIG. 3 shows the system being used to resolve a small-claims court type dispute.

FIG. 3 shows an example of a screenshot of the system working in dispute entering mode. Here Juliet, our example from FIG. 2, is in the process of entering in her basic dispute information (300), (302), and also selecting from a list of available mediators (304). In this example, in the basic dispute information, Juliet has entered in the type of dispute (domestic), subtype (potential in-laws), location (Verona), if there is an escrow amount involved (no), urgency (high), time required for dispute mediation (24 hours). Juliet has also selected to manually select the mediators from a mediator list (306) rather than have the system suggest mediators for her. Juliet has also requested that a system advisor (either a human advisor or an automated algorithm) select a list of mediation suggestions for her. These are shown in (310).

As the example above suggests, the system may provide more than one way to select mediators for a dispute. In some embodiments, the dispute participants may elect to hand select mediators based upon available mediator information. In other embodiments, the system itself may select the mediators, either randomly or else based on a selection process. For example, in one type of selection process, when mediators log in, the system may scroll or otherwise display a list of disputes to the mediators, and the first "n" mediators that show an interest in a particular dispute will be selected by the system to mediate the dispute. Many other mediator selection schemes may also be used.

Finally, FIG. 3 shows an example of an advertisement (312). Use of such advertisements can help the system operator operate as a low-cost or free service. As previously discussed, the system may use basic dispute information such as dispute type and location to offer up potentially relevant advertisements.

Figure 4:
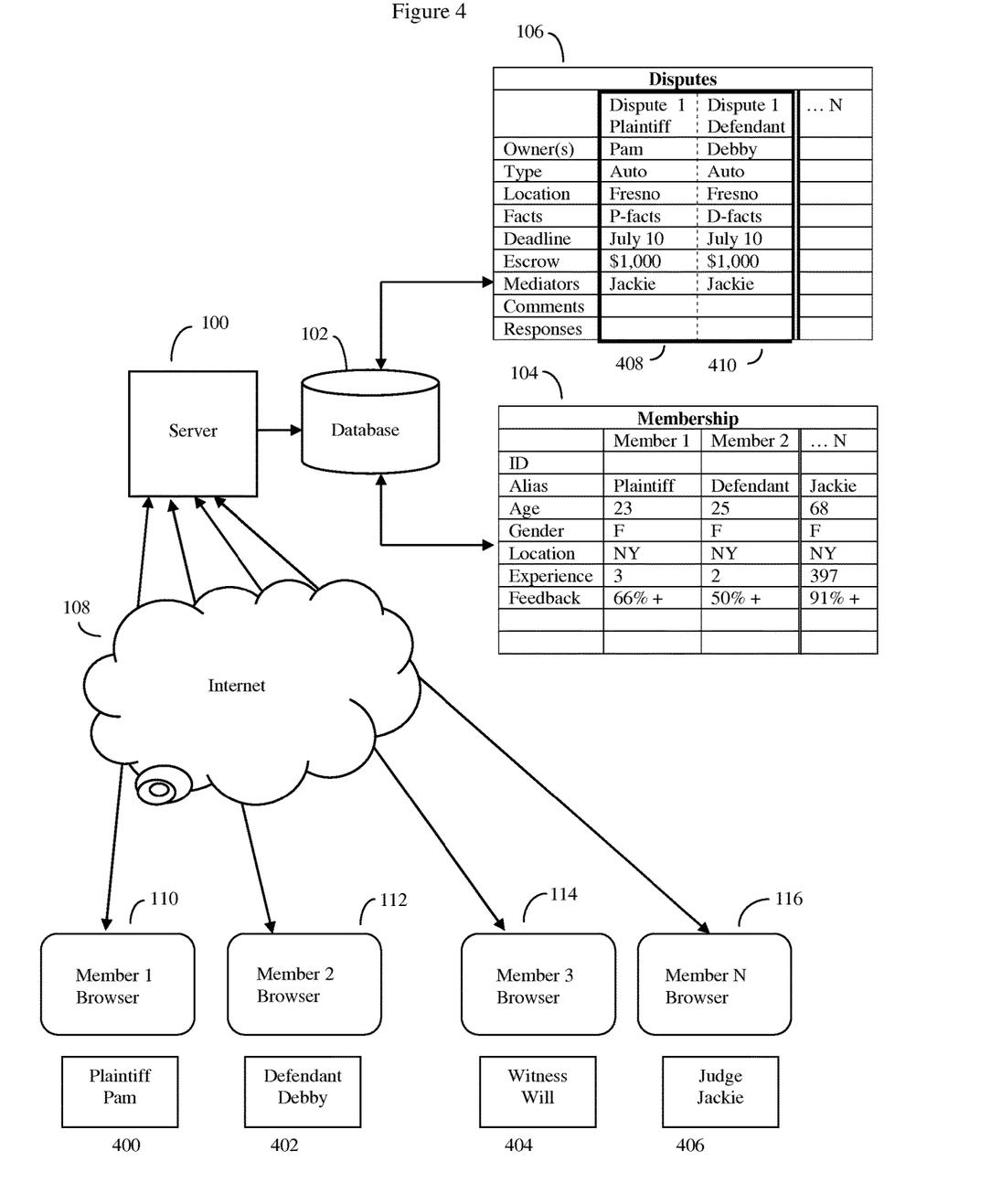
FIG. 4 shows an example screenshot of a user entering in information pertaining to a domestic dispute, and selecting among a list of available mediators.

FIG. 4 shows an example of the system working in a "small claims court" mode. In this example, assume that two women, going by the aliases of "Pam" and "Debby" are disputing the $1,000 insurance deductible charges for a minor "fender bender" accident, which was only partially witnessed by witness with the alias name of "Will". The facts of the situation are in enough dispute that the two cannot agree on liability, and thus are turning to the mediation network to help resolve the problem.

In this example, Pam (400), who may have suffered the auto damage in this case, may open the dispute by uploading data through her web browser (110), Internet (108), web server (100) to database (102) and dispute data (106) opening the dispute as a plaintiff, and uploading the type of dispute (automobile), the approximate location of the accident (Fresno Calif.), her version of the facts, and the deadline for resolving the facts (408)

Here Debby (402), who may not have suffered damage, but who Pam thinks is responsible for the accident and if so may owe Pam the $1,000 deductable payment, may have previously agreed to mediate the dispute using the mediation network. Here assume that Debby has also agreed to put her $1,000 that is potentially owed to Pam into an escrow account that will be held by the system or by a third party escrow service. In this mode, the system will allow Debby (402) to upload her version of the facts by web browser (112), and again through the Internet, server, and database to the dispute database (106), (410).

Here either Pam or Debby can upload information such as photos of the scene of the accident, damage to the car and so on, as well as a link to any witness willing to testify. Here one of them has added a link to witness Will (404), who here is willing to participate through his web browser (114).

Unlike some of the other examples, which used a panel of multiple second members, here Pam and Debby have agreed to put the case before a highly experienced mediation network member Jackie (406), who's membership data indicates has accumulated a huge number of experience (397 relevant cases) and a high level (91%+) of positive feedback. Member Jackie has thus been given the rank of "Judge" by the system, and is thus authorized to mediate disputes by herself.

In this case, Pam, Debby, Jackie and Will can agree to either hold the mediation session online at a given time, or else handle over a period of time as each log in to the system. Here Jackie may review the plaintiffs version of the facts, review the defendant's version of the facts, send questions to witness Will, ask additional to Pam and Debby as needed, and finally render a decision. Depending upon how the system is set up, Jackie may additionally be empowered to release the funds from escrow to whoever prevails in this particular case.

What is claimed is:

1. A computerized method of mediating disputed issues, said method comprising:
    creating a mediation network comprising a membership database of a plurality of member individuals interested in participating in mediation activities, said membership database comprising at least, for each of the plurality of member individuals, email addresses, login identification, passwords, aliases, ages, genders, a mediation experience counter, a mediation history file, wherein the mediation history file includes types of issues involved in mediation experience, a number of times a mediation decision submitted by the member individual was selected, the number of times a mediation decision submitted by the member individual was not selected, when selected, whether the mediation decision was in fact followed, and an approval score whether member individuals who selected and followed the mediation decisions was happy with the result, and approximate locations of said plurality of member individuals, said membership database connected to at least one Internet web server;
    making at least said alias, age, gender, mediation experience counter, and mediation history file for said plurality of member individuals publicly available on said mediation network;
    presenting a graphical user interface in a web browser of an internet connected device to first member of the plurality of member individual, the user interface comprising a facts area in which the first member individual can enter a first set of facts related to a disputed issue involving the first member (dispute member) individual and a dispute information area in which the first member can enter dispute information, and uploading said first set of facts and dispute information to an issue database connected to an Internet web server;
    transmitting the existence of said disputed issue to the web browser of at least one second member (mediation member) individual, based on the data in the membership database of the at least one second member, so that when said at least one second member individual is logged in to said mediation network, said at least one second member individual can choose to participate in mediating said disputed issue,
        wherein if said at least one second member individual chooses to participate in mediating said disputed issue, said mediation network presenting via the graphical user interface an available mediators area comprising information related to the at least one second member individual, the information comprising a combination of at least some of an alias, age, gender, location and feedback;
    receiving via the available mediators area of the graphical user interface a selection of the at least one member individual;
    transmitting said first set of facts to said at least one second member, and invites said at least one second member to transmit back at least one mediation decision to said at least one first member individual,
        wherein if said at least one second member individual chooses to enter said mediation decision, transmitting said at least one mediation decision back to said at least one first member individual for display in an area or web page of the graphical user interface, and incrementing the mediation experience counter(s) associated with said at least one second member;
    providing at least one feedback web page as part of the graphical user interface to said at least one first member wherein said at least one first member may enter in feedback relating to the quality or success of said mediation decision into the mediation history file(s) associated with said at least one second member; and
    update the approval score of the at least one second member based on the feedback.

2. The method of claim 1, wherein said approximate locations comprises one or more location information data selected from the group consisting of country, state, county, city, and zipcode information.

3. The method of claim 1, wherein said first set of facts comprises one or more facts selected from the group consisting of text descriptions and photographs.

4. The method of claim 1, wherein said at least one first member individual can additionally set a mediation response deadline via the dispute information are of the graphical user interface or a minimum number of second member mediation responses deadline.

5. The method of claim 1, wherein said mediation database additionally provides one or more statistical analysis and/or graphical analysis software modules to enable said at least one first member individual to analyze said at least one mediation decision according to said age, gender, mediation experience counter, mediation history file, or approximate geographical location of said at least one second member(s).

6. The method of claim 1, wherein said at least one second member(s) may exchange comments between said at least one first member individual and other said at least one second member(s), and in which said comments are automatically screened for inappropriate words using an automated or human text checker.

7. The method of claim 1, wherein if said at least one first member comprises more than one first members, said first members may both enter and edit said first set of facts related to said disputed issue, via corresponding graphical user interfaces, prior to transmitting said first set of facts to said at least one second member(s).

8. The method of claim 1, wherein said at least one first member may further include human witness email links, telephone numbers, or other hypertext links in said first set of facts.

9. The method of claim 1, wherein said Internet web server presents a list of disputes to said at least one second member(s), and said at least one second members select said disputed issue from said list of disputes and elect to participate in mediating said disputed issue.

10. The method of claim 1, wherein said Internet web server provides a list of suggested dispute mediation responses to said at least one second member(s), and said at least one second member(s) enter their mediation response by selecting at least one element from said list of suggested dispute mediation responses.

11. The method of claim 1, wherein if said at least one first member comprises more than one first members, and at least some of said first members comprise plaintiff first members (plaintiff dispute members) and defendant first members (defendant dispute members) who cannot agree on said first set of facts, then providing for said first set of facts to be divided between a plaintiff first set of facts and a defendant first set of facts, allowing said plaintiff first members to edit said plaintiff first set of facts, allowing said defendant first members to edit said defendant first set of facts, and presenting both said plaintiff first set of facts and defendant first set of facts to said least one second members.

12. The method of claim 11, wherein said mediation network members with a mediation experience counter or a mediation history file that exceeds a preset limit are designated by the mediation network as judges, and said judges are authorized by said mediation network to conduct mediation sessions between said plaintiff first members and said defendant first members.

13. The method of claim 12, wherein mediation network members with real world legal, mediation, or counseling experience are given extra credit in their mediation experience counter and/or mediation history file.

14. The method of claim 11, wherein said plaintiff first members and/or said defendant first members place funds in a escrow account, and said escrow account is released upon receiving said mediation decision.

15. The method of claim 1, wherein said mediation network limits said at least one first member individuals to a preset number of disputed issues that have not received mediation decisions.

16. The method of claim 1, wherein said age, gender, approximate geographic location, and type of mediation issue are provided to advertisers, said advertisers upload advertising media to said mediation network, and said mediation network transmits said advertising media to mediation network members, via corresponding graphical user interfaces, that meet advertiser specified criteria for age, gender, approximate geographic location, and type of mediation issue.

17. The method of claim 1, wherein said membership database is obtained from a social network membership database, and said mediation network is linked to and is accessible from a social network.

18. The method of claim 1, wherein said first member individuals may additionally post questions to at least some of said mediation network members, and receive question responses from said at least some of said mediation network members.

19. The method of claim 1, wherein the dispute information area of the graphical user interface allows the first member individual to request a list of mediation decisions, and wherein the graphical user interface further comprises a decisions area that displays the suggested decisions.

20. The method of claim 1, wherein the feedback included in the available mediators area includes the approval score for each of the at least one second members.

* * * * *